(12) United States Patent
Cheng

(10) Patent No.: US 8,567,468 B2
(45) Date of Patent: Oct. 29, 2013

(54) APPARATUS AND METHOD FOR PRESSING PRINTED CIRCUIT BOARD

(75) Inventor: Chien-Pang Cheng, Tayuan (TW)

(73) Assignee: Zhen Ding Technology Co., Ltd., Tayuan, Taoyuan (TW)

(*) Notice: Subject to any disclaimer, the term of this patent is extended or adjusted under 35 U.S.C. 154(b) by 0 days.

(21) Appl. No.: 13/308,560

(22) Filed: Dec. 1, 2011

(65) Prior Publication Data

US 2012/0160398 A1  Jun. 28, 2012

(30) Foreign Application Priority Data

Dec. 23, 2010 (CN) .......................... 2010 1 0601542

(51) Int. Cl.
*B30B 9/00* (2006.01)
*B30B 15/34* (2006.01)

(52) U.S. Cl.
USPC ........................................... 156/583.1; 425/3

(58) Field of Classification Search
USPC .......... 156/583.1, 583.3, 583.4, 583.6–583.9; 425/3
See application file for complete search history.

(56) References Cited

U.S. PATENT DOCUMENTS

| 1,895,869 | A | * | 1/1933 | Stevens ......................... 315/159 |
| 3,068,435 | A | * | 12/1962 | Oliver, Jr. et al. ............. 336/180 |
| 2011/0006460 | A1 | * | 1/2011 | Vander Wel et al. .......... 264/403 |

FOREIGN PATENT DOCUMENTS

JP        61154822 A   *   7/1986

* cited by examiner

*Primary Examiner* — John Goff
*Assistant Examiner* — Scott W Dodds
(74) *Attorney, Agent, or Firm* — Altis & Wispro Law Group, Inc.

(57) ABSTRACT

An apparatus for heating and pressing a printed circuit board includes a first pressing member, a second pressing member, a driving member, a heater and an electromagnetic assembly. The driving member is configured for driving the first pressing member and the second pressing member to move toward or away from each other. The heater is configured for heating one of the first and second walls, and the electromagnetic assembly is capable of generating a magnetic field to attract the second wall to create additional pressure.

6 Claims, 3 Drawing Sheets

APPARATUS AND METHOD FOR PRESSING PRINTED CIRCUIT BOARD

BACKGROUND

1. Technical Field

The present disclosure relates to apparatuses and methods for manufacturing a printed circuit board (PCB), and more particularly relates to an apparatus for activating a layer of glue on a PCB and a method using the same.

2. Description of Related Art

Many circuit boards comprise a substrate having a pattern of copper conductive tracks formed onto it. The substrate can either be rigid, or flexible. Active and passive electronic components are soldered onto the board via a set of pads arranged around the periphery of a component site.

In a manufacturing process for a PCB, the copper conductive tracks may be protected from oxidation by coating the circuit board with a film of material. The film includes an insulation layer such as polyimide, and an adhesive layer. The adhesive layer is arranged between the circuit board and the insulation layer. A pressing apparatus comprising an upper hot press plate, and a lower hot press plate is provided. The film is positioned between the upper and lower hot press plates, and then the adhesive layer is melted by the upper and lower hot press plates. Then the lower hot press plate is pushed by a cylinder rod to move close to the upper hot press plate, so as to press the film and the circuit board firmly together. Finally, the adhesive is cured, thereby forming a PCB protected from oxidation. The end of the cylinder rod just contacts the center portion of the lower hot press plate, thus the pressure applied to the center portion of the film is greater than that applied to the surrounding region. Thus some melted material of the adhesive layer will stream from the center region to the surrounding portion, which causes a non-uniform thickness of the adhesive layer. In addition, the surrounding region with dense conductive tracks may not be totally covered or filled with the adhesive material of the adhesive layer because of differences in pressure, thereby forming bubbles on the PCB. Too many bubbles may cause bad adhesion between the circuit board and the protective film.

What is needed, therefore, is an apparatus for more reliably pressing a PCB and a method using the same.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below and with reference to the drawings.

Figure 1:
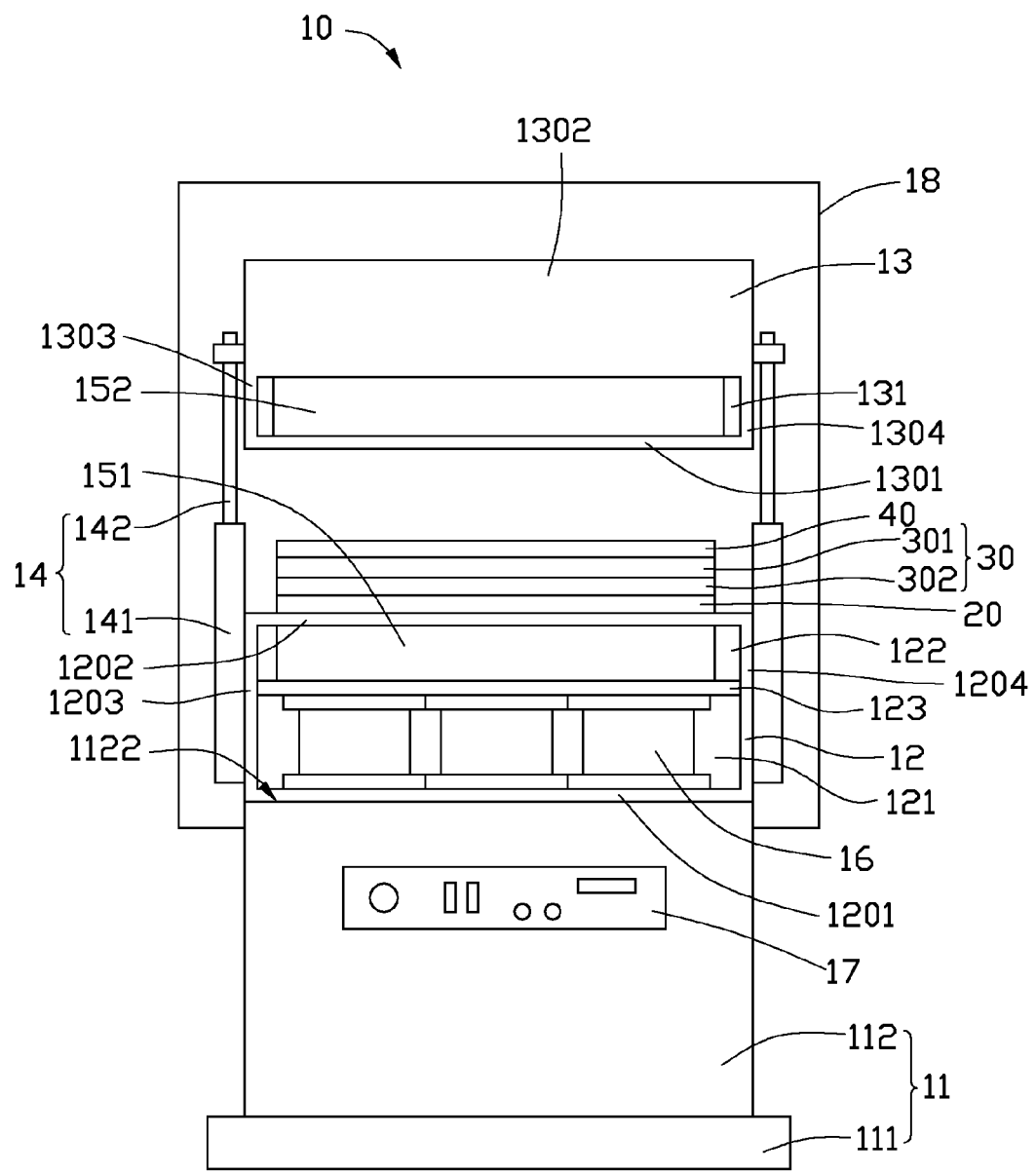
FIG. 1 is a schematic view of an apparatus for pressing a PCB according to an exemplary embodiment, comprising a first pressing member and a second pressing member.
Figure 2:
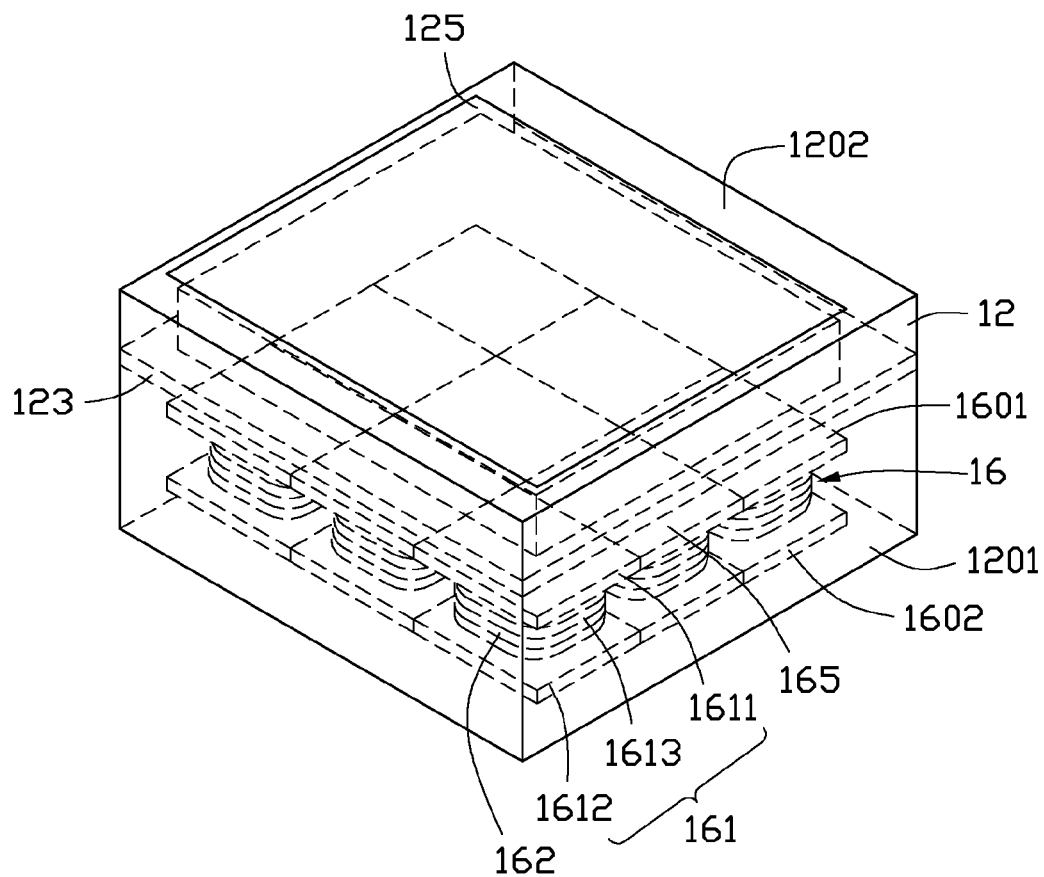
FIG. 2 is a schematic view of the first pressing member of the apparatus in FIG. 1, showing an electromagnetic assembly in the first pressing member.

Referring to FIGS. 1 and 2, an apparatus 10 for pressing and heating a PCB according to a first exemplary embodiment includes a supporting member 11, a first pressing member 12, a second pressing member 13, two driving members 14, a first heater 151, a second heater 152, an electromagnetic assembly 16 and a controller 17. The apparatus 10 presses a PCB 20 and an anti-oxidation protective film (protective film 30) together to bond the protective film 30 firmly onto a surface of the PCB 20. The protective film 30 includes an insulation layer 301 such as polyimide film, and a heat-activated adhesive layer 302 between the PCB 20 and the insulation layer 301.

The first pressing member 12 and the driving members 14 are arranged on the support member 11. The second pressing member 13 is connected to the driving members 14. The electromagnetic assembly 16 is arranged in the first pressing member 12. The second pressing member 13 is arranged over the first pressing member 12. The driving members 14 move the second pressing member 13 up and down, and thereby the first pressing member 12 and the second pressing member 13 may cooperatively render the protective film 30 and the PCB 20 into one unit. The first heater 151 is arranged in the first pressing member 12 and heats the first pressing member 12, and the second heater 152 is arranged in the second pressing member 13 and heats the second pressing member 13. The first and second pressing members 12, 13 then compress and heat the protective film 30 and the PCB 20 together. The second pressing member 13 includes magnetic material. Thus, the electromagnetic assembly 16 in the first pressing member 12 attracts the second pressing member 13, so as to compress the PCB 20 and the protective film 30 more firmly. The controller 17 controls the operations of first pressing member 12, the second pressing member 13, the driving members 14, the first heater 151, the second heater 152 and the electromagnetic member 16.

The support member 11 includes a base plate 111 and a support main body 112 arranged on the base plate 111. The base plate 111 bears the support main body 112. The support main body 112 has a support surface 1122 facing away from the base plate 111.

The first pressing member 12 is rectangular and hollow, and is mounted on the support surface 1122. The first pressing member 12 includes a first lower wall 1201 contacting the support surface 1122, and a first upper wall 1202. The first pressing member 12 includes an effective pressing region 125, where the PCB 20 and the protective film 30 can be positioned and processed. In this exemplary embodiment, the effective pressing region 125 has an area less than that of the first upper wall 1202, and is at the center of the first upper wall 1202. The first pressing member 12 further includes a first sidewall 1203 interconnecting the first lower wall 1201 and the first upper wall 1202, and a second sidewall 1204 opposite to the first sidewall 1203.

The first pressing member 12 defines a receiving cavity 120 therein. The receiving cavity 120 includes a first cavity portion 121 adjacent to the first lower wall 1201, and a second cavity portion 122 adjacent to the first upper wall 1202. The first cavity portion 121 and the second cavity portion 122 are partitioned by a thermally insulating board 123. The first heater 151 is received in the second cavity portion 122, and heats up the first upper wall 1202 of the first pressing member 12. The thermally insulating board 123 protects the second cavity portion 122 from the passage of heat generated by the first heater 151.

The electromagnetic assembly 16 is received in the first cavity portion 121. The electromagnetic assembly 16 includes a plurality of electromagnetic units 160 arranged in an array. Each of the electromagnetic units 160 includes an I-shaped magnetic core 161 and an electromagnetic coil 162. The I-shaped magnetic core 161 includes a first rectangular core plate 1611, a second rectangular core plate 1612, and a cylindrical core 1613. The two ends of the cylindrical core 1613 are connected to the first and second rectangular core plates 1611, 1612. The cylindrical core 1613 is perpendicular to the first and second rectangular core plates 1611, 1612. Each of the first and second rectangular core plates 1611, 1612 has a larger area than that of the ends of the cylindrical core 1613, thereby the first rectangular core plate 1611, the second rectangular core plate 1612, and the cylindrical core 1613 cooperatively forming an "I" shape. The electromagnetic coil 162 is wound around the cylindrical core 1613. In this embodiment, the electromagnetic coils 162 of the plurality of electromagnetic units 160 have a same number of windings. The first core plates 1611 of the plurality of the electromagnetic units 160 are parallel with each other and are arranged side by side, thereby forming a first electromagnetic panel 1601. The second core plates 1612 of the plurality of the electromagnetic units 160 are parallel with each other and are arranged side by side, thereby forming a second electromagnetic panel 1602. The first electromagnetic panel 1601 is adjacent to the first upper wall 1202, and the second electromagnetic panel 1602 is adjacent to the first lower wall 1201. In this embodiment, the first electromagnetic panel 1601 has an upper surface 165 facing toward the thermally insulating board 123, and is parallel with the first upper wall 1202. The surface area of the upper surface 165 is equal to that of the effective pressing region 125.

The second pressing member 13 includes a second lower wall 1301, a second upper wall 1302 opposite to the second lower wall 1301, a third sidewall 1303 interconnecting the second lower wall 1301 and the second upper wall 1302, and a fourth sidewall 1304 opposite to the third sidewall 1303. The second lower wall 1301 is arranged adjacent to the first upper wall 1202. The surface area of the second lower wall 1301 is equal to that of the first upper wall 1202, and is aligned with the first upper wall 1202. The third sidewall 1303 and the first sidewall 1203 are at the same side, and the fourth sidewall 1304 and the second sidewall 1204 are at the same side. The second lower wall 1301, the second upper wall 1302, the third sidewall 1303 and the fourth sidewall 1304 cooperatively define a receiving cavity 131. The second heater 152 is received in the receiving cavity 131, and heats the second lower wall 1301. The second lower wall 1301 is comprised of a magnetic material.

Each of the driving members 14 includes a sliding sleeve 141 and a cylinder rod 142. The cylinder rod 142 extends out of the sliding sleeve 141 and is slidable in the sliding sleeve 14. The driving member 14 further includes an air or oil pump (not shown) for pushing and pulling the cylinder rod 142. The sliding sleeve 141 and the cylinder rod 142 of one driving member 14 are respectively fixed to the first sidewall 1203 and to the third sidewall 1303, and the sliding sleeve 141 and the cylinder rod 142 of the other driving member 14 are respectively fixed to the second sidewall 1204 and to the fourth sidewall 1304. When the cylinder rods 142 slide in the sliding sleeves 141, the second pressing member 13 moves toward or away from the first pressing member 12.

The controller 17 is installed on the support main body 112. The controller 17 includes an interface incorporating buttons, knobs and one or more displays. The controller 17 is operated to control the flow of power in the electromagnetic coils 162, to control the driving members 14 to move the second pressing member 13, and to control the first and second heaters 151, 152 to heat the first and second pressing members 12, 13.

The apparatus 10 further includes an outer shield or casing (cover 18) enclosing the first pressing member 12, the second pressing member 13 and the driving member 14.

Figure 3:
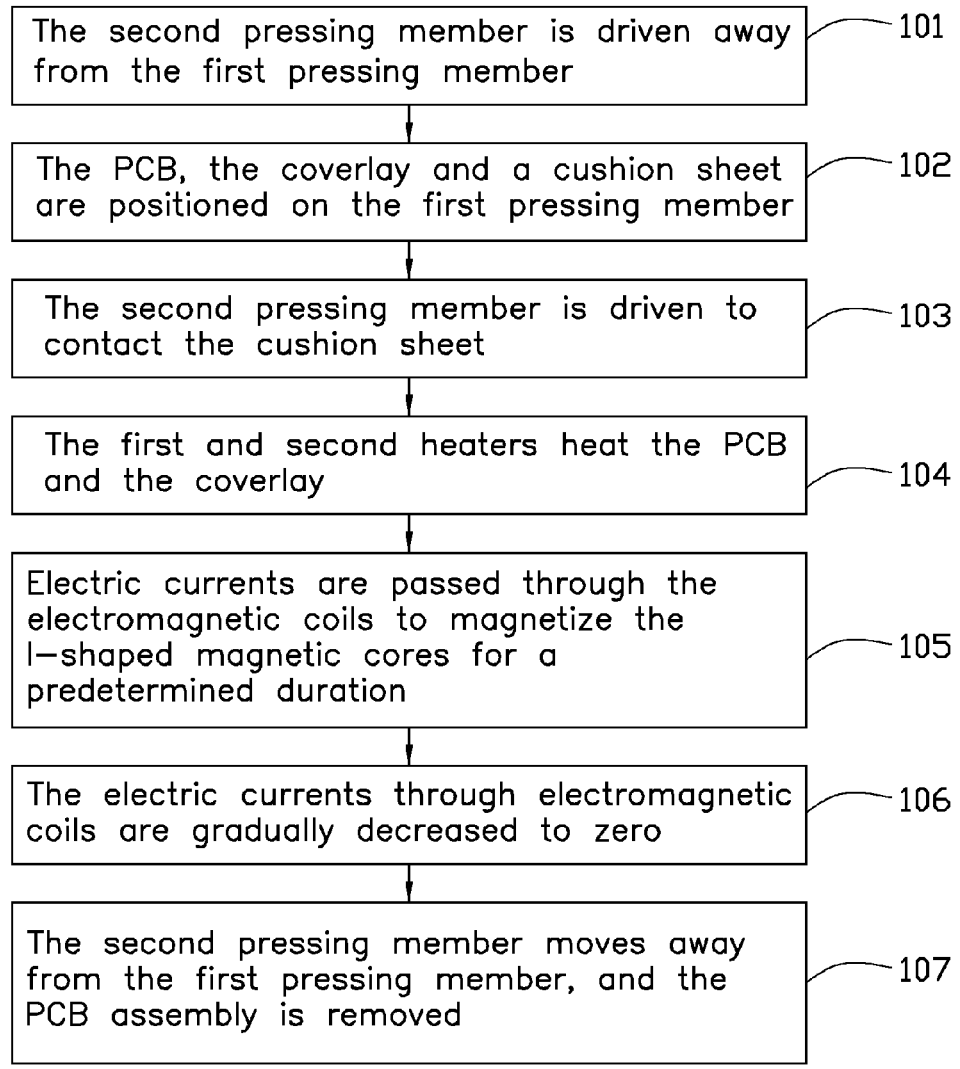
FIG. 3 is a flow chart of a method for pressing a PCB using the apparatus of FIG. 1.

Referring also to FIG. 3, a pressing method for pressing the PCB 20 and the protective film 30 firmly together according to a second exemplary embodiment includes the steps below.

Step 101, to provide clearance, the second pressing member 13 is driven to move away from the first pressing member 12 by the driving member 14.

In step 101, the driving member 14 can be started by operating the controller 17. The cylinder rods 142 slides upward to move the second pressing member 13 away from the first pressing member 12 until there is a predetermined distance between the first upper wall 1202 of the first pressing member 12 and the second lower wall 1301 of the second pressing member 13.

Step 102, the PCB 20, the protective film 30 and a cushion sheet 40 are positioned on the first upper wall 1202. The adhesive layer 302 of the protective film 30 is in contact with the PCB 20.

In step 102, the PCB 20 and the protective film 30 are positioned in the effective pressing region 125. The cushion sheet 40 is arranged on the protective film 30. The cushion sheet 40 can be a polypropylene film or a silica gel sheet. The cushion sheet 40 prevents the PCB 20 from deforming in the following pressing step, and enhances heat dissipation.

Step 103, the second pressing member 13 is driven close to the first pressing member 12 until the second lower wall 1301 of the second pressing member 13 contacts the cushion sheet 40.

In step 103, the driving member 14 is started, and the cylinder rod 142 slides downward. The second pressing member 13 moves close to the first pressing member 12 as the cylinder rod 142 slides until the second lower wall 1301 of the second pressing member 13 contacts the cushion sheet 40. Then, the pressure on the cylinder rod 142 to the second pressing member 13 is removed by turning off the air or oil pump of the driving member 14 and releasing the pressure medium in the driving member 14. In this situation, the second pressing member 13 rests on the cushion sheet 40 by its own gravity.

Step 104, the first heater 151 and the second heater 152 are started to heat the PCB 20 and the protective film 30. The adhesive layer 302 of the protective film 30 becomes molten and adheres to the PCB 20 by the pressing of the second lower wall 1301 of the second pressing member 13.

In step 104, the first and second heater 151, 152 are started by operating the controller 17. The adhesive layer 301 is heated to softness, and even be molten.

Step 105, electric currents are passed through the electromagnetic coils 162 to magnetize the I-shaped magnetic cores 161 for a predetermined duration. A magnetic force is generated between the electromagnetic assembly 16 and the second pressing member 13, thereby compressing the PCB 20 and the protective film 30 more firmly together.

In step 105, the electric power supplied to all the electromagnetic coils 162 is equal, thus resulting in an overall uniformity of pressure between all the surface areas of the first and second pressing members 12, 13. Therefore, a uniform thickness of adhesive can be obtained. The magnetic force between the first pressing member 12 and the second pressing member 13 can be made large enough to ensure the total filling of the adhesive into the surrounding region with the dense conductive tracks of the PCB 20, thereby preventing the formation of any bubbles in the protective film. The magnetic force can be adjusted by changing the electric current through the electromagnetic coils 162, and can be also be adjusted to operate in a wave-like manner, by energizing the coils 162 in the center to start and then energizing the next coil(s) towards the outside, so as to provide a wiping or sweeping action to further discourage or remove any bubbles in the adhesive.

Step 106, the electric currents through electromagnetic coils 162 are gradually decreased to zero.

Step 107, the driving member 14 moves the second pressing member 13 upward, thereby away from the first pressing member 12, and the PCB assembly is removed. The insulation layer 301 of the protective film 30 acts as a protective film for protecting the copper conductive tracks of the PCB 20 from oxidation.

In the case of an adhesive which is not activated by heat the first heater 151 or the second heater 152 or both can be omitted. The electromagnetic assembly 16 can be received in the second pressing member 13. The driving member 14 can also be arranged above the pressing member 13. Also, the driving member 14 can be any other type of drive which is effective, such as hydraulic drive cylinder.

While certain embodiments have been described and exemplified above, various other embodiments will be apparent to those skilled in the art from the foregoing disclosure. The present disclosure is not limited to the particular embodiments described and exemplified but is capable of considerable variation and modification without departure from the scope of the appended claims.

What is claimed is:

1. A printed circuit board pressing apparatus, comprising:
   a first pressing member comprising a first wall, the first pressing member defining a first cavity adjacent to the first wall;
   a thermally insulating board partitioning the first cavity into a first cavity portion and a second cavity portion, the first cavity portion being adjacent to the first wall, and the second cavity portion being away from the first wall;
   a second pressing member comprising a second wall, the second wall facing toward the first wall, the second wall comprised of a magnetic material, the first wall and the second wall configured for compressing a printed circuit board placed therebetween, the second pressing member defining a second cavity adjacent to the second wall;
   at least one driving member configured for moving the first pressing member and the second pressing member toward or away from each other;
   a first heater and a second heater, the first heater arranged in the first cavity portion, the second heater arranged in the second cavity, the first heater and the second heater configured for heating at least one of the first and second walls; and
   an electromagnetic assembly received in the second cavity portion, the electromagnetic assembly configured for generating a magnetic field to attract the second wall, the first heater located between the first wall and the electromagnetic assembly.

2. The apparatus of claim 1, wherein the second pressing member is arranged over the first pressing member.

3. The apparatus of claim 2, wherein the electromagnetic assembly comprises a plurality of electromagnetic units arranged in an array.

4. The apparatus of claim 3, wherein each of the electromagnetic units comprises an I-shaped magnetic core and an electromagnetic coil, the I-shaped magnetic core comprising a first rectangular core plate, a second rectangular core plate and a cylindrical core connected between the first and second rectangular core plates, the electromagnetic coil wound around the cylindrical core, the first rectangular core plates arranged side by side, thereby cooperatively forming an electromagnetic panel, the electromagnetic panel being parallel with the first wall.

5. The apparatus of claim 4, wherein the at least one driving member comprises two driving members arranged on opposite sides of the first pressing member, each of the two driving members comprising a sliding sleeve and a cylinder rod the cylinder rod being fixed to the second pressing member, the sliding sleeve being fixed to the first pressing member, the cylinder rod being slidable in the sliding sleeve thereby driving the second pressing member to move relative to the first pressing member.

6. The apparatus of claim 4, wherein the first wall comprising an effective pressing region, where the printed circuit board positioned, the effective pressing region being at the center of the first wall, the electromagnetic panel being adjacent to the first wall in respect to the second rectangular core plates, the surface area of the electromagnetic panel being equal to that of the effective pressing region.

* * * * *